United States Patent
Xu et al.

(10) Patent No.: US 8,063,995 B2
(45) Date of Patent: Nov. 22, 2011

(54) SYSTEM AND METHOD FOR VIDEO NOISE REDUCTION USING A UNIFIED THREE-DIMENSIONAL NON-LINEAR FILTERING

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1306 days.

(21) Appl. No.: 11/710,626

(22) Filed: Feb. 23, 2007

(65) Prior Publication Data

US 2008/0205854 A1    Aug. 28, 2008

(51) Int. Cl.
*H04N 7/18*    (2006.01)
*H04N 5/00*    (2011.01)

(52) U.S. Cl. ........ 348/701; 348/607; 348/699; 348/700; 382/275; 382/261; 375/240.29

(58) Field of Classification Search ............... 348/607, 348/620, 699, 700, 701; 375/240.29, 240.16; 382/275, 261, 236
See application file for complete search history.

(56) References Cited

U.S. PATENT DOCUMENTS

| | | | |
|---|---|---|---|
| 2006/0103765 A1 | 5/2006 | Zhou et al. | |
| 2006/0139493 A1 | 6/2006 | Kim | |
| 2006/0139494 A1* | 6/2006 | Zhou et al. | ........... 348/607 |

* cited by examiner

*Primary Examiner* — Michael Lee
*Assistant Examiner* — Jean W Desir

(57) ABSTRACT

The system described herein is a unified approach to three-dimensional filtering for the reduction of video noise. The technique is based on weight averaging pixels of the filter's output value in a three-dimensional neighborhood, in space and time, of the filter's output value. The weights can be computed for individual factors, such as distance, regional differences, etc., or can be combined into a weight that is indicative of all individual weights.

20 Claims, 6 Drawing Sheets

Computing the final set of Weights and the Filter Output.

A three-dimensional volume of pixels in a video sequence.

Estimate output for pixel $I(x,y,t)$ using the three-dimensional filter.

Computing the final set of Weights and the Filter Output.

SYSTEM AND METHOD FOR VIDEO NOISE REDUCTION USING A UNIFIED THREE-DIMENSIONAL NON-LINEAR FILTERING

BACKGROUND OF THE INVENTION

1. Field of the Invention

The present invention relates generally to video and image processing. In particular, the system described herein is designed to reduce additive noise in video sequences using three-dimensional non-linear filtering.

2. Description of the Related Technology

In the past decade applications of digital video have increased dramatically. These applications range from the use of digital video for cinemagraphic archiving, medical imaging, video storage and playback on DVDs. In addition, digital video also forms the basis for more efficiently transmitting television, via cable, over the air, and over the Internet.

The last application is especially important. It is based on video compression, a set of algorithms that are based on digital video. The algorithms achieve higher compression ratios than what would be capable through analog techniques, thereby reducing the bandwidth required for transmission of video. Where formerly a cable channel's bandwidth would support the transmission of a single analog video channel, with digital compression cable operators could operate at various points on the resolution/bandwidth trade off curve, allowing 12 video channels of average quality or 7-8 channels of superior quality to be transmitted in a bandwidth that formerly carried one analog channel of video. Video compression has also made HDTV possible: without it the bandwidth required for transmission could not be supported within the present allocations for bandwidth. Digital video is fundamental to the transmission of video using the Internet's packetized techniques. It allows the use of buffers to eliminate variations in a packet's time of arrival, and the application of even more powerful compression algorithms that further reduce the usage by the video signal of the channel's capacity (which in the Internet is shared by other users).

The pervasive use of digital video has spawned increased interest and demand for noise filtering algorithms. Noise reduction can be critical to overall system operation, since the presence of noise in video not only degrades its visual quality but affects subsequent signal processing tasks as well. Noise especially is deleterious to digital video that will be compressed and decompressed. The effect is inherent in compression algorithms. These algorithms are designed to recreate a sequence of images that will be perceived by the eye as being virtually identical to the images created from the uncompressed data. Since they do not reject noise, the compression algorithms treat it as signal, and attempt to create data that represents components of noise that will be most visible to the eye. Worse yet, in most instances the output of the video compression unit is limited in data rate to match it to the rated capacity of the channel through which the data is transmitted. When noise captures some of bits that are outputted by the video compressor, fewer bits are left to represent the real signal. Therefore noise reduction—the elimination, as far as possible, of noise contaminating the video—is a desirable adjunct to video compression.

Noise is a catch-all term for an unwanted signal that is interfering with the signal that is desired. It is noticeably present in television receivers situated in areas with having marginal signal conditions for receiving a conventional amplitude modulated vestigial sideband television signal. This noise is commonly modeled as being additive, white and Gaussian. In the case of analog video delivered by satellite, the video signal is frequency modulated onto a carrier. The baseband signal delivered by the ground receiver is accompanied by noise that is additive and Gaussian when the receiver is operating above threshold (i.e., when the vector representing the noise in signal space is usually much smaller than the vector representing the modulated signal). When the system is close to threshold, the character of the noise becomes impulsive, leading, for example, to the clicks that are heard on an automobile radio as the FM station being received goes out of range. For video transmitted by satellite, the impulses appear in the picture as short white or dark streaks. A satellite or terrestrial television receiver may also be affected by man-made noise such as impulsive noise originating from motor vehicles.

Applying noise reduction to video is the process of identifying the desired video signal and using that information to discriminate against the noise. Best performance is achieved by having a broad range of processing options that is available only through the use of digital techniques. The input video would be sampled into numerical pixel values indexed by horizontal and vertical spatial coordinates and a time coordinate that is an indicator of frame number. A filtering operation is modeled as a sequence of arithmetic operations performed on the input samples to form an output pixel.

Noise reduction inherently implies averaging together elements of the signal that are almost identical. Suppose a given pixel has a noise-free value of 0.5, meaning its brightness is half-way between peak white and black. The pixel is contaminated by noise $n_1$, so the pixel value that is actually available is $P_1=0.5+n_1$. With additional knowledge, a second pixel may be found in another position with value $P_2=0.5+n_2$, where $n_1$ and $n_2$ are both noise values and are uncorrelated and have the same variance. The weighted average of 0.5 $P_1$+0.5 $P_2$ is found to be equal to $0.5+\frac{1}{2}(n_1+n_2)$. The power in $\frac{1}{2}(n_1+n_2)$ is one-half the power in $n_1$ or $n_2$. Thus, averaging together the values of the two pixels improves the signal/noise ratio of the estimated pixel value by a factor of 2. However, if $P_2=0.3+n_2$, meaning that the brightness of the second pixel was closer to black, then 0.5 $P_1$+0.5 $P_2=0.4+\frac{1}{2}(n_1+n_2)$. The net effect of weighting $P_1$ and $P_2$ equally before averaging in the second case is to introduce an error into the estimate for the brightness of the pixel the weighted average is supposed to represent. This example illustrates the basic principle of this invention: to reduce the noise level associated with a particular pixel, weight average its value with a second pixel value whose noise free brightness is close to the one in question. When the confidence level in the equality of the noise free brightness levels is high, the weights assigned to the 2 pixel values should be approximately equal; if the confidence level is low, the second pixel level is effectively disregarded by making its weight close to zero, with the first pixel value weighted by (1−weight used for 2nd pixel).

In the current state of the art, the best noise rejection performance is achieved with three-dimensional filters that combine two-dimensional spatial filters and one-dimensional temporal filters to obtain the benefits of each. Actually the potential of unrestricted three dimensional filtering potentially goes beyond what has been achieved to date. While separating the three-dimensional sampling grid into a two-dimensional spatial grid combined with a one-dimensional temporal grid may make the processing of the signal more convenient because fewer processing operations per input data point may be required, the limitation of separating the filtering of video in time and space unduly restricts the available design options. Allowing unrestricted three-dimensional filtering would expand the design options to include more complex algorithms for video processing. A generalized approach is likely to offer superior performance for noise reduction with fewer deleterious side effects, such as blurring and apparent loss of resolution. Therefore, there is a need for a refinement of three-dimensional digital filtering into classes of algorithms that simplify the application of the algorithm while preserving the likelihood of optimal performance that three-dimensional filtering promises.

SUMMARY OF CERTAIN INVENTIVE ASPECTS

One inventive aspect presented herein is a system for noise reduction that comprises a method for filtering pixels in a plurality of video frames by determining, for a selected pixel, weights for a set of pixel intensities in the video frames, and thereby determining a weighted average of the set of pixel intensities, which is identified as an output data point of the filter.

Another inventive aspect of the system presented here comprises a modular system for filtering pixels in a plurality of video frames that includes a data module configured to select a pixel intensity and its location coordinates, a weight module configured to determine, for the selected pixel, weights for a set of pixel intensities in the video frames, and a summation module configured to determine a weighted average using the weights and pixel intensities that is identified as an output data point of the filter.

Another inventive aspect of the system presented here comprises a machine readable medium that comprises instructions that upon execution cause a machine to perform a method for filtering pixels in a plurality of video frames, the method comprising determining, for a selected pixel, weights for a set of pixel intensities in the video frames, determining a weighted average using the weights and the pixel intensities and identifying it as a data point of the filter's output.

Another inventive aspect of the system presented herein is a video filtering processor for reducing picture noise in a plurality of video frame that is configured to determine, for a selected input pixel, weights for a set of pixel intensities in the video frames and determines a weighted average using the weights and pixel intensities that is identified as a data point of the filter's output.

Another inventive aspect of the system presented here is a system for filtering pixels in a plurality of video frames comprising means for selecting a pixel from one of the frames, means for determining weights for a set of pixel intensities in the video frames, means for determining a weighted average using the weights and pixel intensities and identifying the weighted average as a data point of the filtered output.

DETAILED DESCRIPTION OF CERTAIN INVENTIVE EMBODIMENTS

The following detailed description is directed to certain specific aspects of the three-dimensional noise reduction filter. However, the system can be embodied in a multitude of different ways as defined and covered by the claims. In this description, reference is made to the drawings wherein like parts are designated with like numerals throughout.

After recording, storing, and transmitting video, the underlying signal may become contaminated with analog additive noise that degrades the picture. In the system described here a unified three-dimensional method to reduce additive noise in the video sequences is presented. This system goes beyond those suggested in the literature. The present approaches can be categorized into three types: a spatial noise reduction filter, a temporal noise reduction filter and 3D noise reduction filter. The spatial noise reduction filter filters the input image in the spatial domain only, ignoring information in the temporal direction. Temporal noise reduction filtering operates only on pixels in the temporal direction and can further be divided into motion adaptive methods and motion compensated methods. The motion adaptive methods filter the pixel at the same location in width and height from frame to frame, basing the filter elements on the degree to which relative motion between the frames at the pixel location is detected. The motion compensated methods filter the pixel along the motion trajectory based on their motion estimation results. Existing three-dimensional noise reduction filters combine temporal filters with spatial filters to get the benefits of each.

In this patent application, a unified method three-dimensional non-linear filtering for noise reduction is described. Instead of applying temporal and spatial noise reduction separately, i.e., cascading the two operations, in this system, filter optimization takes place in all three dimensions simultaneously. Superior performance should ensue, because the class of filters being considered for optimization includes the spatial and temporal separable case as a subset.

For values of video intensity corrupted by additive uncorrelated, zero-mean noise, if all the data has the same original noise-free value, then averaging the observed noisy data values together reduces to a minimum the mean squared errors and removes the noise effectively. Based on this observation, the proposed filtering procedure searches for the similar data within a sequence of frames and then takes the weighted average of the similar data to obtain the filtered data. The weight used is an indicator of the estimated similarity of the two pixels.

Figure 1A:
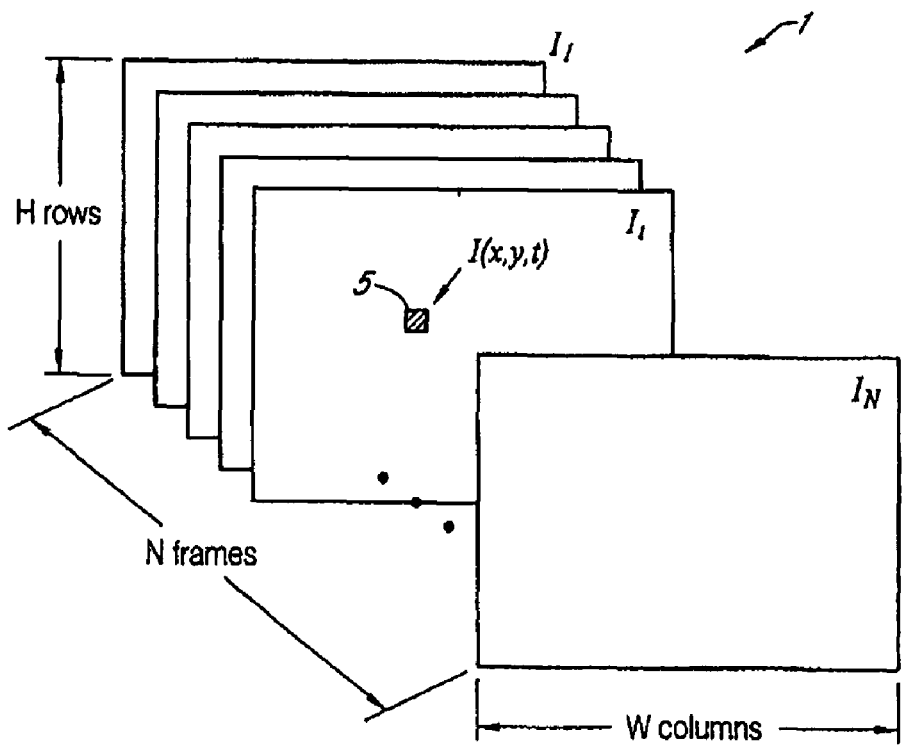
FIG. 1A illustrates the parameters describing a sequence of video frames and shows the presence of one pixel.
Figure 1B:
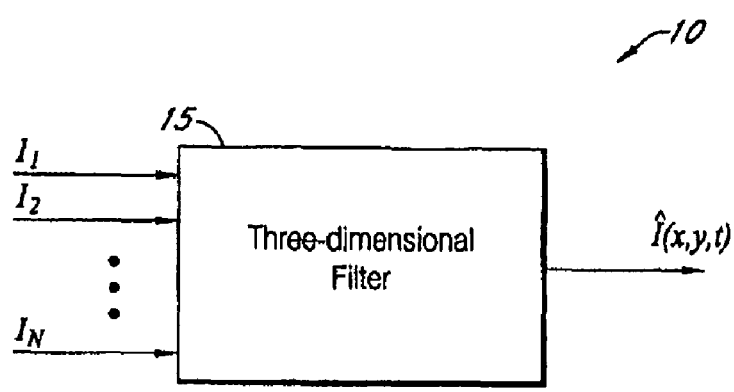
FIG. 1B is a block diagram of the overall operation of the three-dimensional filter in the system.

Disclosed embodiments consider the whole video sequence as a support region for the proposed filtering to estimate the noise free pixel values. Assuming the video sequence 1 contains N frames of H×W images, where N is the total frame numbers, H is the number of rows in each frame and W is the number of columns in each frame, a pixel intensity is written as a function of space and time, i.e., I(x, y, t), where $0 \leq x \leq W$, $0 \leq y \leq H$ and $0 \leq t \leq N$. The pixel's intensity is shown graphically as a functional value 5 in FIG. 1A. The filter 10 of the present invention utilizes all the information available from the input video I for estimation of each individual pixel value as shown in FIG. 1B. The filtered value at (x, y, t) by the three-dimensional filter 15 is represented as $\hat{I}(x, y, t)$ $$\hat{I}(x, y, t) = \frac{1}{C} \sum_{\substack{0 \le u \le W \\ 0 \le v \le H \\ 0 \le k \le N}} w_{u,v,k} \cdot I_{u,v,k} \quad (1)$$

$$\text{where } C = \sum_{\substack{0 \le u \le W \\ 0 \le v \le H \\ 0 \le k \le N}} w_{u,v,k} \quad (2)$$

In this case, the filter provides a weighted average of the whole volume of pixels as the output for a single pixel's coordinates. Each weight $w_{u,v,k}$ is a non-linear function of the pixel's location x, y, t, the variables of summation u, v, k and the pixel values of the whole video sequence. Therefore, the filter described above is a non-linear filter.

To apply the concept of weight averaging for noise reduction filtering, the weight for each pixel must be determined. The degree to which two pixels have similar values can depend on the temporal distance, spatial distance, pixel value difference, local mean value difference, and the summation absolute difference of a local region centered at the pixel. The following will examine these metrics individually.

Temporal Distance

Temporal distance $D_{td}$ between the pixel of interest I(x, y, t) and a supporting pixel I(u, v, k) is defined as:

$$D_{td} = |k - t|. \quad (3)$$

A weight $w_{td}$ that depends only on temporal distance would be functionally related to $D_{td}$:

$$w_{td} = f_{td}(D_{td}). \quad (4)$$

Figure 2A:
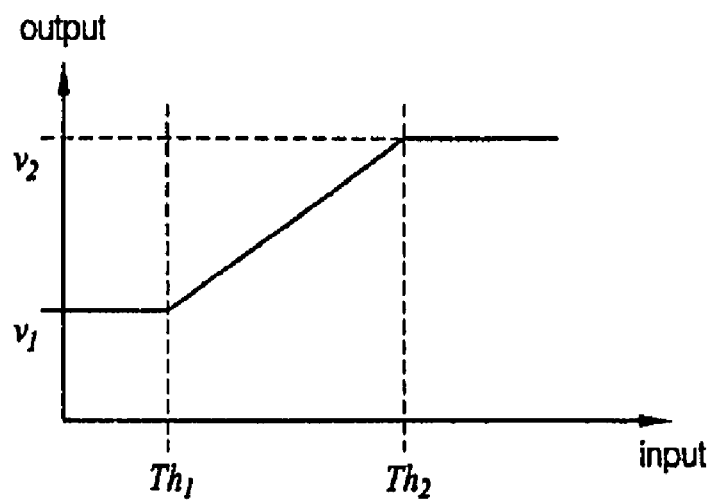
FIGS. 2A and 2B illustrate the piecewise linear characteristic of a soft switcher.
Figure 2B:
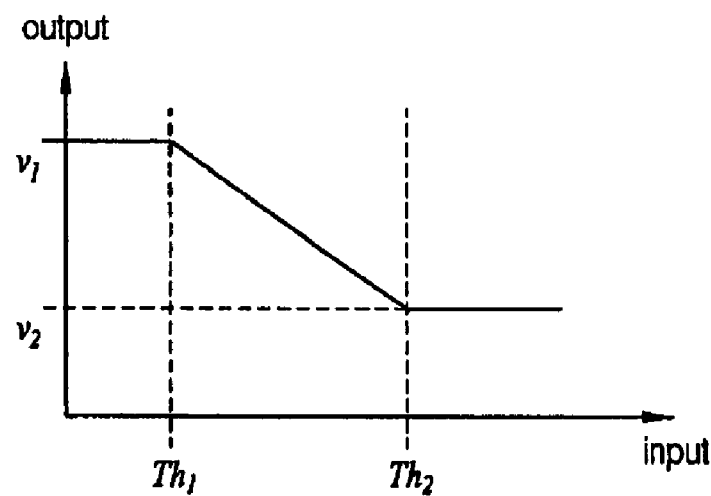

In one embodiment of this system, the function $f_{td}$ is implemented as a soft switching of the distance. Soft switching is the piecewise linear characteristic shown in FIGS. 2A and 2B that defines the relationship between the input and output based on four values: $v_1$, $v_2$, $Th_1$, and $Th_2$. The input is compared to the thresholds $Th_1$ and $Th_2$: based on the result of the comparison, the output is determined by the values $v_1$ and $v_2$. There are two cases shown individually in FIGS. 2A and 2B. In FIG. 2A, $v_1 \le v_2$, while in FIG. 2B, $v_1 \ge v_2$. The relationship between the input and output is defined as follows:

$$\text{output} = \begin{cases} v_1 & \text{if input} \le Th_1 \\ v_1 + \frac{v_2 - v_1}{Th_2 - Th_1}(\text{Input} - Th_1) & \text{if } Th_1 < \text{input} < Th_2 \\ v_2 & \text{if input} \ge Th_2 \end{cases} \quad (5)$$

Setting $v_2=0$, $Th_2=1$, forces $w_{td}$ to be zero whenever the temporal distance $D_{td}$ is greater than or equal to 1. With this choice of $f_{td}$, only pixels within the same frame can affect the filter's output, changing the proposed filter to a spatial filter.

In one embodiment of the present invention, $v_1=1$, $v_2=0$, $Th_1=1$, $Th_2=2$, i.e., $$w_{td} = \begin{cases} 1 & D_{td} \le 1 \\ 0 & D_{td} > 1 \end{cases}. \quad (6)$$

In this case, only two frames that are adjacent in the temporal direction are considered for filtering the pixel of interest. Larger values of $Th_2$ would cause more frames to enter into the calculation of filter output, thereby requiring more frame memory in implementation.

Spatial Distance

Spatial distance $D_{sd}$ between the pixel of interest I(x, y, t) and a supporting pixel I(u, v, k) is defined as any distance measure between the spatial locations of the two pixels, for example, the first order norm or the second order norm. In one embodiment of the present invention, the spatial distance $D_s$ is defined as the Euclidean distance:

$$D_{sd} = \sqrt{(x-u)^2 + (y-v)^2}. \quad (7)$$

A weight $w_{sd}$ that brings this spatial distance into the filter's output is a function of the spatial distance $$w_{sd} = f_{sd}(D_{sd}). \quad (8)$$

In one embodiment of the present invention, the function $w_{sd} = f_{sd}(D_{sd})$ is also defined as a soft switching of the spatial distance, with $v_1=1$, $v_2=0$, $Th_1=5$, $Th_2=7$. Larger values of the thresholds could be used, but would cause the hardware to grow as well.

In cases where the motion estimation is performed and the resulting motion vector between frame k and frame t for the pixel I(x, y, t) is available, writing the motion vector as $mv = (v_x, v_y)$, the definition of the distance can be modified as follows:

$$D_s = \sqrt{(x-u-v_x)^2 + (y-v-v_y)^2}. \quad (9)$$

Pixel Difference

Pixel difference $D_p$ between the pixel of interest I(x, y, t) and a supporting pixel I(u, v, k) is defined as the difference in intensity between the two pixels. In another embodiment the color difference between two pixels is defined as the pixel difference. In the embodiment of the present invention, the pixel difference $D_p$ is defined as:

$$D_p = |I(x,y,t) - I(u,v,k)|. \quad (10)$$

A weight $w_{dif}$ that considers this pixel difference is defined as a function of the pixel difference $D_p$ as:

$$w_{dif} = f_{dif}(D_p). \quad (11)$$

As in weight selection for the temporal and spatial distances, soft switching is also employed for weights that depend on pixel difference. This design choice is a least cost option over other nonlinear functions, and is part of this embodiment of the noise reduction filter.

However, to determine whether the original values of two pixels are close to being identical, the variance of additive noise must be estimated. Alternate procedures for estimating the noise variance from a video sequence may be found in the literature. Therefore, the power level of the noise contaminating the video sequence can be considered to be known. Using the standard deviation of the noise, say σ, the thresholds $Th_1$ and $Th_2$ can be related to the standard deviation of the noise.

In one embodiment of the present invention, the thresholds and the values for the soft switching are defined to be $v_1=1$, $v_2=0$, $Th_1=3.0 \cdot \sigma$, $Th_2=5.0 \cdot \sigma$. In this case, if the difference between two pixels is greater than five times of the estimated standard deviation of the Gaussian noise, the weight becomes zero, and thus this pixel would not contribute to the weight averaging.

Region Difference

Region difference $D_{mean}$ between the pixel of interest I(x, y, t) and a supporting pixel I(u, v, k) is defined as the difference between the average value of the two local regions centered at the two pixels. As in the case of the pixel difference $D_p$, region difference $D_{mean}$ can be used to measure either the intensity difference or the color difference. The average value of the local regional can be defined in alternate embodiments either as the result of simple averaging or weight averaging, where the weight is related to the distance between the two pixels. In the present instance, region difference $D_p$ is defined as:

$$D_{mean} = \frac{1}{C}\left|\sum_{(x',y')\in R(x,y)} I(x', y', t) - \sum_{(u',v')\in R(u,v)} I(u', v', k)\right|, \quad (12)$$

where R(m,n) defines a local region of coordinates (m,n), and C is a normalization constant which is equal to the area of the local region. In one embodiment of this present invention, a rectangular 3×3 window is defined for the local region, hence C=9.

A weight $w_{mean}$ that relates the regional difference metric to the filter's output is defined as a function of the region difference, $D_{mean}$, given by $$w_{mean} = f_{mean}(D_{mean}). \quad (13)$$

In this embodiment of the present invention, the soft switching concept is applied to $f_{mean}$. Sine the region difference summation performs some smoothing of the additive noise, the threshold values can be smaller than the thresholds defined for the pixel difference. Here the soft switching parameters are set to be $v_1=1$, $v_2=0$, $Th_1=3.0 \cdot \sigma$, $Th_2=5.0 \cdot \sigma$.

Sum of Absolute Difference

The sum of absolute difference (SAD) metric measures the similarity between two local regions. The SAD difference $D_{sad}$ between the pixel of interest I(x, y, t) and a supporting pixel I(u, v, k) is defined as the averaged summation of the absolute difference between the pixel values of the two local regions centered at the two pixels. Usually, only the intensity difference is used for calculating the SAD differences. In this embodiment of the present invention, the SAD difference $D_{sad}$ is defined as:

$$D_{sad} = \frac{1}{C}\left|\sum_{(m,n)\in R} |I(x+m, y+n, t) - I(u+m, v+n, k)|\right|, \quad (14)$$

where R defines a local region of coordinates (m,n), and C is a normalization constant which is equal to the area of the local neighborhood. In one embodiment of this present invention, a rectangular 3×3 window is defined for the local neighborhood, hence C=9.

A weight $w_{sad}$ that relates the SAD difference metric to the filter's output is defined by the function $f_{sad}$:

$$w_{sad} = f_{sad}(D_{sad}). \quad (15)$$

In this embodiment of the present invention, soft switching is used to realize $f_{sad}$ and its parameters are set to $v_1=1$, $v_2=0$, $Th_1=0$, $Th_2=2.0 \cdot \sigma$.

Sorting and Total Weight

In the discussion above, different weights or individual metrics were computed for the pixel intensity I(u, v, k). Additional metrics could have been introduced, for example, the difference between the two local histograms and the difference between the two local variances. In this embodiment, all these individually computed weights are combined together for a final weight that is indicative of the similarity between I(x, y, t) and I(u, v, k) and the regions surrounding the two points. The combination operation is embodied as a multivariate function of the individual weights, i.e., the weight for the intensity w(u, v, k) is given by $$w(u,v,k) = f_w(w_{td}, w_{sd}, w_{dif}, w_{mean}, w_{sad}). \quad (16)$$

In one of the embodiments of the present invention, the intermediate weight w' is calculated as the product of all the individual weights:

$$w' = w_{td} \cdot w_{sd} \cdot w_{dif} \cdot w_{mean} \cdot w_{sad}. \quad (17)$$

After obtaining the intermediate w' for each pixel, all the pixels are sorted according to their weight w', and an additional weight $w_{sort}$ is defined as a function of the sorted rank r(u, v, k) for each pixel.

In this embodiment of the present invention, a number N is defined as a cut-off level. If the rank r(u, v, k) of a pixel is less than N, this pixel will not be used for the weight averaging, i.e., $$w_{sort}(u, v, k) = \begin{cases} 1 & \text{if } r(u, v, k) \leq N \\ 0 & \text{else} \end{cases}. \quad (18)$$

The final weight w(u, v, k) then can be defined as the product of the intermediate weight w' and the additional sorting weight $w_{sort}$:

$$w(u,v,k) = w' \cdot w_{sort}. \quad (19)$$

Therefore the filtered video is $$= \frac{1}{C}\sum_{r(u,v,k)\geq N} w'_{u,v,k} \cdot I_{u,v,k}, \text{ where } C = \sum_{r(u,v,k)\geq N} w'_{u,v,k} \quad (20)$$

System Structure

Figure 3:
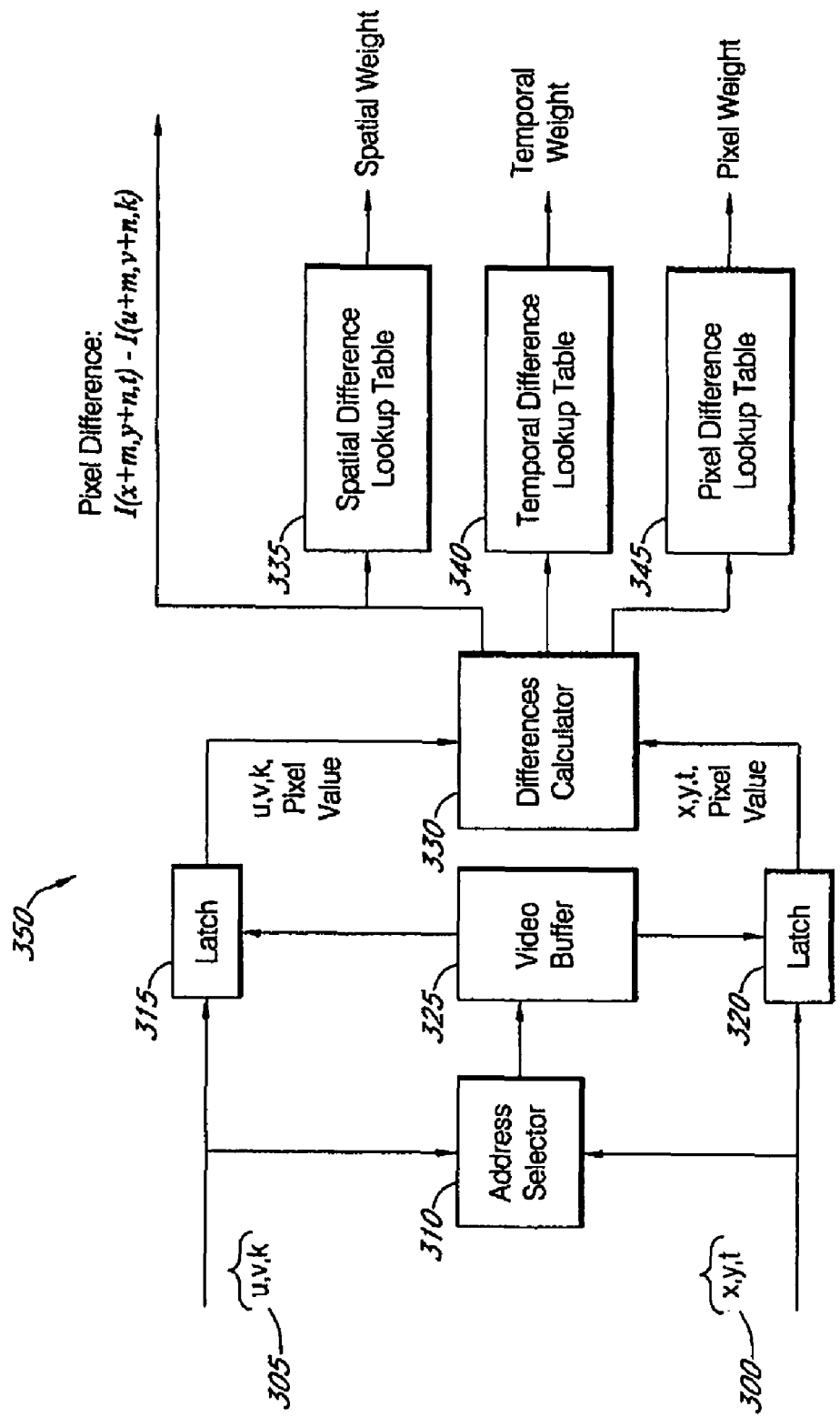
FIG. 3 is a block diagram of the single-variable operations needed to compute a subset of the weights.

A system for computing the weights that are determined by the single pixel value and their location coordinates is shown in FIG. 3. After new initial values of x, y, and t are reset, the variables x, y, and t are cycled through all their possible combinations, which occupies, as FIG. 1 illustrates, the three-dimensional rectilinear solid, defined by $0 \leq x \leq H$, $0 \leq y \leq W$, and $0 \leq t \leq N$. For each combination at least one weight must be computed for use in the weight averaging computation that defines the filter's operation. Consistency requires that all pixels be treated the same; therefore the set of weight-types must be the same for each pixel being weighted.

Returning to FIG. 3, data flow 350 for computing the weights related to the spatial difference, the temporal difference, and the pixel difference takes as inputs (x, y, t), the current location coordinates of the filter's output shown in bracket 300 and (u, v, k), the location coordinates of the pixel to be filtered, shown in bracket 305. These are alternately selected by address selector 310 and passed to the video buffer 325, instructing the buffer to look up I(x, y, t) and I(u, v, k). These values and their location coordinates are separately sent to two latches, latch 315 storing (u, v, k, I(u, v, k)) and latch 320 storing (x, y, t, I(x, y, t)). A difference calculator 330 computes the spatial distance between locations (x, y) and (u, v), the time difference |k−t|, and the pixel difference and passes these quantities individually to the weight functions that are stored as look up tables. The spatial weight function is stored as look up table 335, the temporal weight function, as look up table 340, and the pixel weight function, as look up table 345.

Figure 5A:
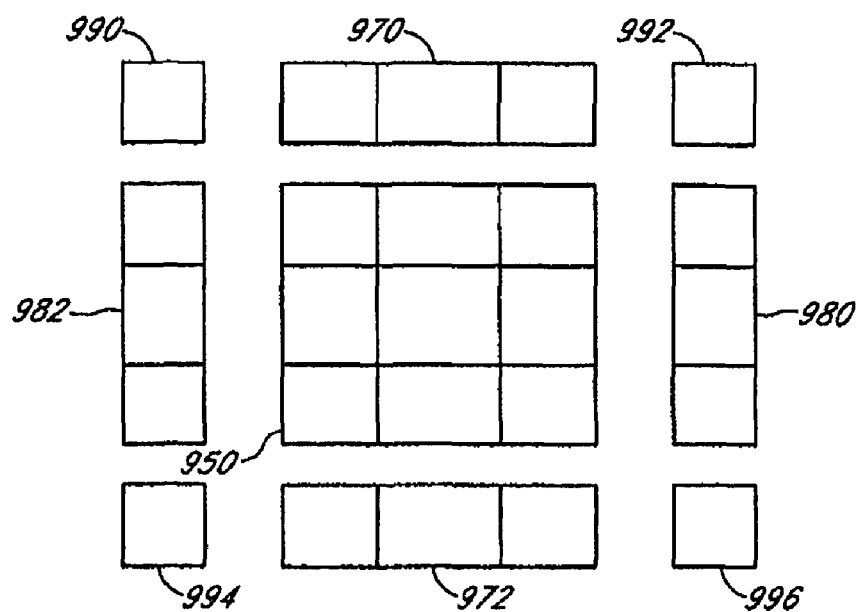
FIGS. 5A and 5B illustrate a method for growing the memory locations used to store weights that conserves memory space.
Figure 5B:
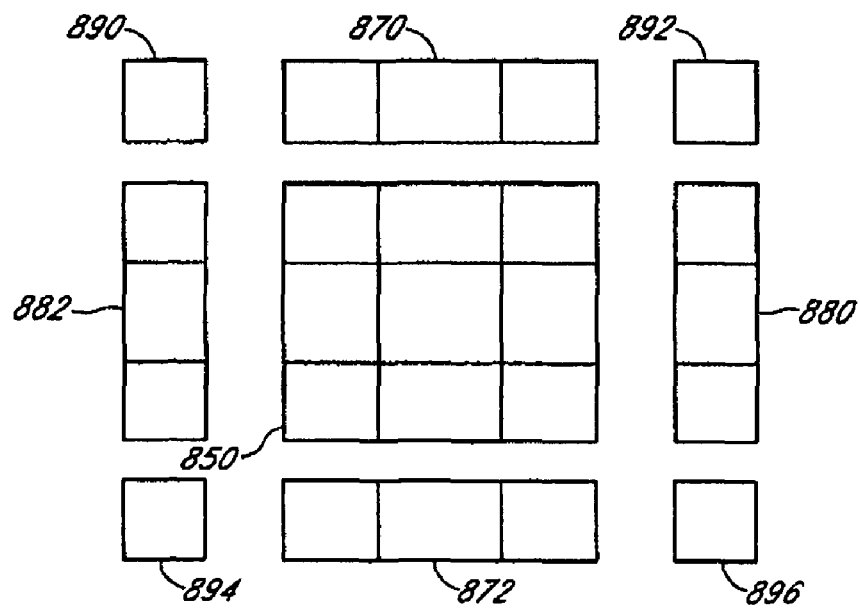

The values of the weights computed in tables 335, 340 and 345 are stored in the output section of the filter 500 shown in FIG. 5. In particular, the temporal weights are stored in temporal weight map 505, the spatial weight map 510 and the pixel difference map 520. Recognizing that the weights will tend toward zero as (u, v, k) moves away from (x, y, t), weights for values of (w, v, k) that are closer to (x, y, t) are computed first, with the computation terminating when the weights are substantially zero on the boundary that separates the region for which weights have been computed from the rest of (u, v, k) space. A technique for organizing the map that achieves these ends is shown in FIGS. 5A and 5B. The idea behind this technique is to think of a weight storage memory organized as a three-dimensional structure with rectangular faces. First u and v are both incremented by ±1. Doing so causes new weights to be computed, requiring additional storage locations. FIG. 5A shows how the expansion of storage locations would be organized for fixed t when the limits to u and v are increased or decreased by unity. The locations 950 represent storage sites for existing data; memory locations 990, 992, 994 and 996 represent either increasing the upper or decreasing the lower limits to both u and v by one; memory locations 980 and 982 represent increasing or decreasing the limits to u by one while keeping the upper and lower limits to v at their current values; likewise 970 and 972 represent extending the limits for v by one or decreasing the lower limit by one while keeping the limits to u constant. In general, 950 would be a three-dimensional shape with rectangular faces; 990, 992, 994, and 996 would each consist of a single memory location; and 972, 970, 982, and 980 are shapes that are one storage location thick whose face is rectangular also. When k is incremented by one unit, the region in which the weights are defined expands as shown in FIG. 5B. A new layer, weight location 850, for the region of weight definition is found by using the new limiting value of k and existing limiting values of u and v.

Figure 4:
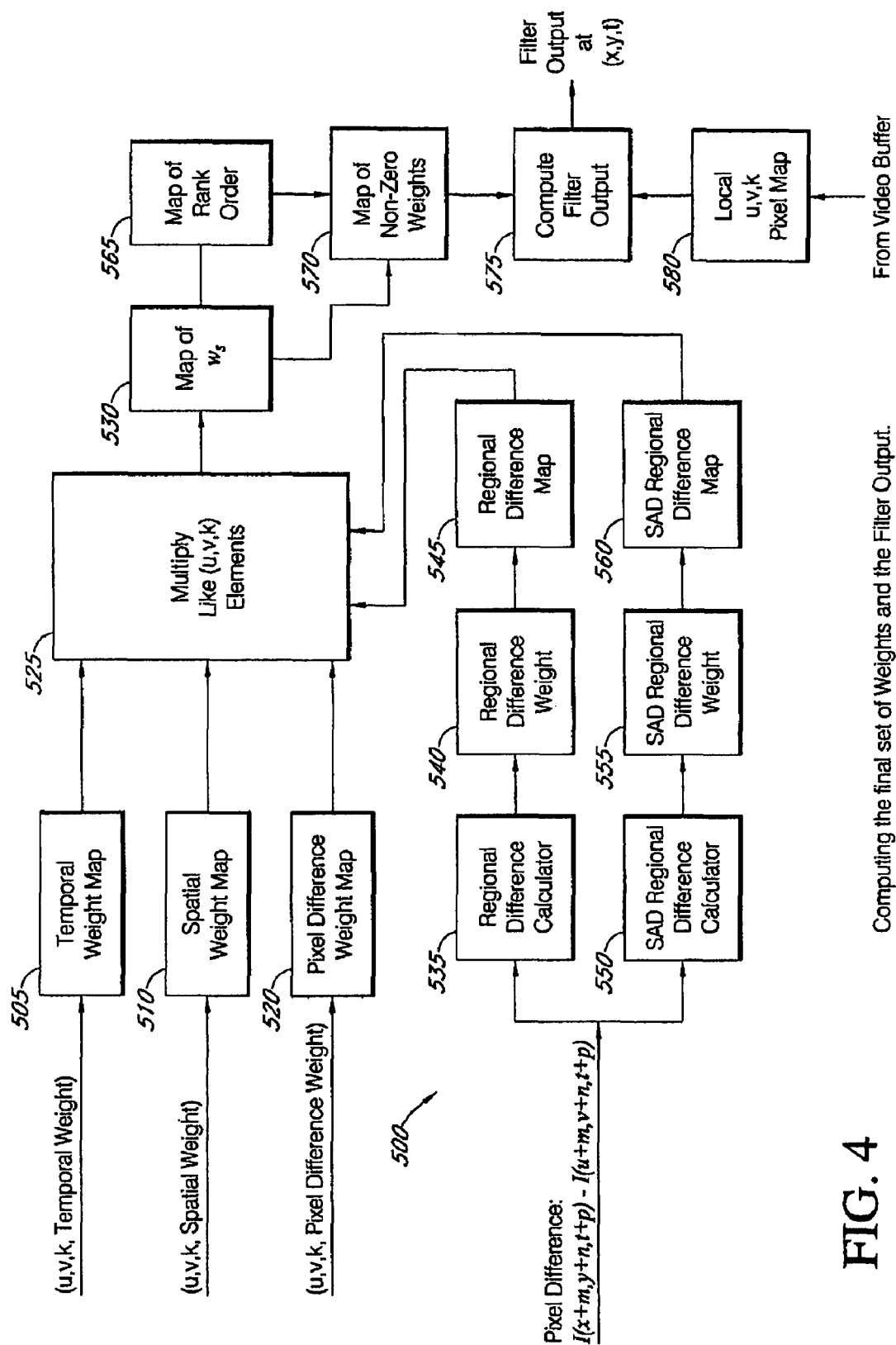
FIG. 4 is a block diagram describing the generation of the weights not found in FIG. 3.

The other additions, storage locations 890, 894, 896 and 892 and 892, 880, 870 and 880 have the same meaning as similarly numbered locations with the 9xx prefix except that the value of k is now set to the new upper limit. All structures in FIG. 5B are one memory location thick in the direction that is perpendicular to the paper. A similar memory organization may be employed in the regional difference map 545 and SAD regional difference map 560 of FIG. 4. These units accept their input from regional difference calculators 534 and 550, respectively. The calculators process the pixel difference between the values of the intensities at (u+m, v+n, t) and (x+m, v+n, k). These variables are created by a logic driver (not shown) for input into the video frame buffer. When all the necessary information is assembled in the regional difference calculator 535 and SAD regional calculator 550, their internal logic computes the requisite differences for input into the regional weight and SAD regional weight functions represented as piecewise linear functions in regional difference weight function 540 and SAD regional weight function 555. These weights are stored in the regional difference map 545 and the SAD difference map 560.

In the final calculation, the weights for like values of (u, v, k) are assembled and multiplied together in 525 to form w', the composite weight. These are stored in their own map 530. This map is processed into a second map 565, in which the value of each composite weight is replaced by its ranking, after the non-zero weights are ordered in magnitude. Having that information, the filter's output can now be computed in accordance with Eq. (19) in block 575, in which the pixel intensities stored in 580 are weighted and summed.

Figure 6:
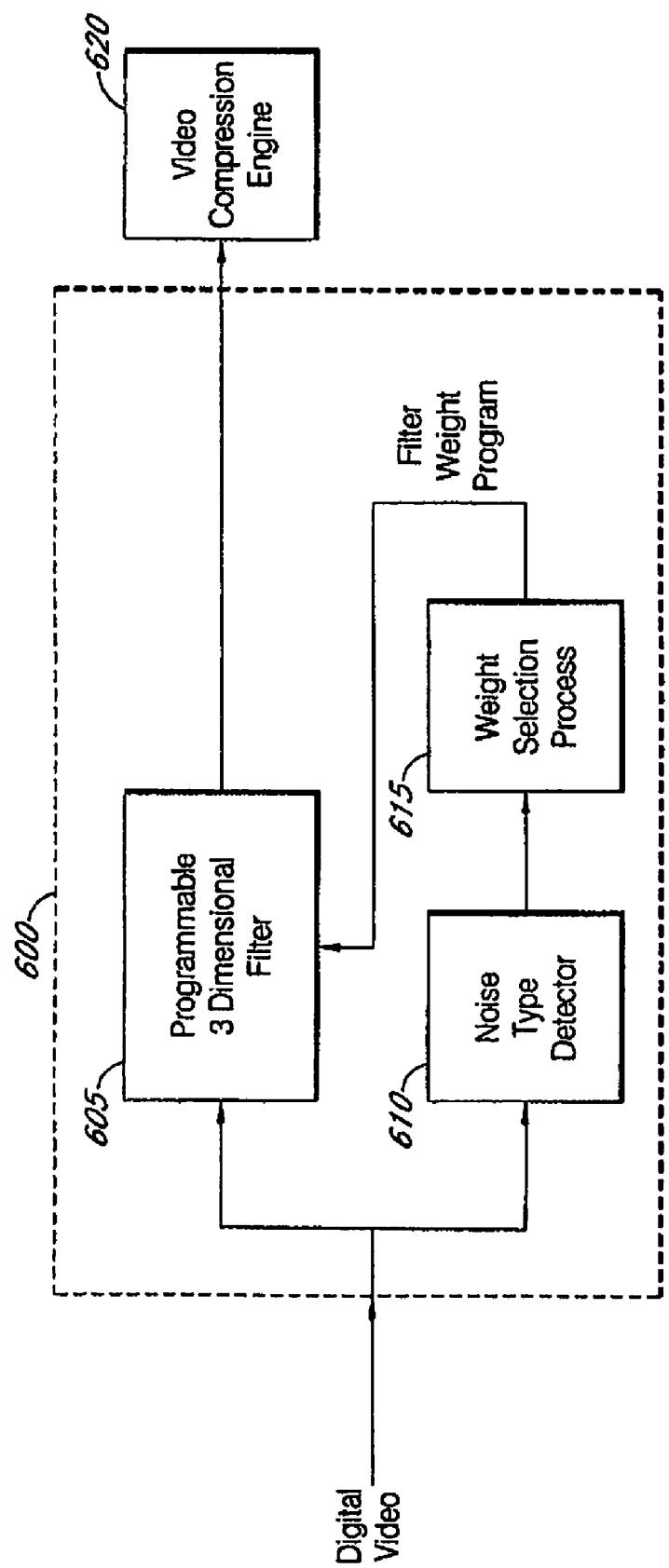
FIG. 6 illustrates an application of a unified, three-dimensional non-linear filter as a preprocessor for a video compression engine.

An application for this filter as a preprocessor for a video compression engine is presented in block 600 of FIG. 6. Within this block, the statistics and typical waveforms of the noise corrupting the video are sensed in block 610. Based on the results of measurement, a method for generating the weights is specified in the three-dimensional filter 605 by the selection process in block 615. The filtered video is then fed to the video compression engine, block 620. This exemplary application shows the potential uses inherent in the filter's structure.

The neighborhood may have a dimension of from about 2 to about 5 frames by from about 2 to about 8 lines by from about 10 to about 20 pixels per line. The neighborhood may have a dimension of 3 frames by 5 lines by 15 pixels per line.

It is noted that the system may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and signals may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the system is intended to be illustrative, and not to limit the scope of the claims.

What is claimed is:

1. A method of filtering pixels in a plurality of video frames, the method comprising:
    selecting a first pixel from one of the video frames, the first pixel having location coordinates at a horizontal position x, a vertical position y, and a time t;
    determining weights for a set of pixel intensities in the video frames, wherein each weight is based on at least one pixel in a neighborhood of the first pixel and at least one pixel in a neighborhood of the pixel to be weighted, the weight applied to a pixel is determined by a functional relationship to at least one of the following metrics:
        the spatial distance between the location coordinates x, y, and the spatial location coordinates of the pixel being averaged;
        the spatial distance between the location coordinates x, y and the motion compensated values of the spatial location coordinates of the pixel being averaged;
        the difference between the time t and a value of time associated with the pixel being averaged;
        the average of the absolute value of difference between the average intensity in a two-dimensional spatial neighborhood of the pixel being averaged and the average intensity in a spatial neighborhood of the pixel at the x and y;
        the absolute value of the average difference between the intensity of the pixel at x, y, t and the intensity of the pixel being averaged;
        the average, taken over a two-dimensional neighborhood of x and y, of the absolute value of the difference between the intensity of a pixel displaced from x and y and the intensity of a pixel identically displaced from the pixel being averaged;
    determining a weighted average using the weights and the pixel intensities; and
    identifying the weighted average as the filtered output at pixel location x, y, and t.

2. The method of claim 1, wherein a group of weights is determined by applying a functional relationship defined for each weight to the metric to which it applies.

3. The method of claim 1, wherein an intermediate weight is determined as a multivariate function of the weights in the group of weights.

4. The method of claim 3, wherein a metric is determined, for each set of location coordinates, by ranking the intermediate weight in an ordering of such weights, and including its rank in the group of metrics.

5. The method of claim 4, wherein the weight determined by ranking the intermediate weights is unity if the rank is equal or higher than a predetermined constant and is zero if the rank is less than that constant.

6. The method of claim 5, wherein the weight applied to the pixel in the weighted average of pixels is the intermediate weight in correspondence to the weight determined by the ranking being unity and wherein the weight is zero otherwise.

7. The method of claim 3, wherein the multivariate function of the weights comprises multiplying the weights together.

8. The method of claim 2, wherein the functional relationship between the metrics and weights comprises four quantities, $v_1$, $v_2$, $Th_1$, and $Th_2$ and a piecewise linear input/output characteristic whose functional dependence is as follows:
    if the input is less than $Th_1$, the output is $v_1$;
    if the input is greater than $Th_2$, the output is $v_2$; and
    if the input is between $Th_1$ and $Th_2$, the output is found by linearly interpolating between the points $(Th_1,v_1)$ and $(Th_2, v_2)$.

9. The method of claim 8, wherein the values of the four quantities are determined by simulation.

10. The method of claim 1, wherein the neighborhood has a dimension of from about 2 to about 5 frames by from about 2 to about 8 lines by from about 10 to about 20 pixels per line.

11. The method of claim 10, wherein the neighborhood has a dimension of 3 frames by 5 lines by 15 pixels per line.

12. A modular system for filtering pixels in a plurality of video frames by a device, the modules comprising:
    a data module configured to select a first pixel from one of the video frames, the first pixel having location coordinates at a horizontal position x, a vertical position y, and a time t, the data module producing the pixels and their location coordinates in the neighborhoods of the second pixel and the first pixel respectively;
    a weight module configured to determine weights for a set of pixel intensities in the video frames, wherein each weight is based on at least one pixel in a neighborhood of the first pixel and at least one pixel in a neighborhood of the pixel to be weighted, the weight module determines a group of metrics including:
        the spatial distance between the coordinates x, y, and the location coordinates of the pixel being averaged;
        the spatial distance between the spatial coordinates x, y and the motion compensated values of the spatial coordinates of the pixel being averaged;
        the difference between the time t and a value of time associated with the pixel being averaged;
        the absolute value of the average difference between the intensity of the pixel at x, y, t and the intensity of the pixel being averaged;
        the absolute value of the difference between the average intensity in a two-dimensional spatial neighborhood of the pixel being averaged and the average intensity in a spatial neighborhood of the pixel at the x and y;
        the sum, taken over a two-dimensional neighborhood of x and y, of the absolute value of the difference between the intensity of a pixel displaced from x and y and the intensity of a pixel identically displaced from the pixel being averaged; and
    a summation module configured to determine a weighted average using the weights and the pixel intensities that is identified as the filtered output at pixel location x, y, and t.

13. The modular system of claim 12, wherein a group of weights is determined by applying a functional relationship defined for each weight to the metric to which it applies.

14. The modular system of claim 12, wherein the neighborhood has a dimension of 3 frames by 5 lines by 15 pixels per line.

15. A machine readable medium comprising instructions that upon execution cause a machine to perform a method of filtering pixels in a plurality of video frames, the method comprising:
- selecting a first pixel from one of the video frames, the first pixel having location coordinates at a horizontal position x, a vertical position y, and a time t;
- determining weights for a set of pixel intensities in the video frames, wherein each weight is based on at least one pixel in a neighborhood of the first pixel and at least one pixel in a neighborhood of the pixel to be weighted, the weight applied to a pixel is determined by a functional relationship to at least one of the following metrics:
  - the spatial distance between the location coordinates x, y, and t and the location coordinates of the pixel being averaged;
  - the spatial distance between the spatial coordinates x, y and the motion compensated values of the spatial coordinates of the pixel being averaged;
  - the difference between the time t and a value of time associated with the pixel being averaged;
  - the absolute value of the average difference between the intensity of the pixel at x, y, t and the intensity of the pixel being averaged;
  - the absolute value of the difference between the average intensity in a two-dimensional spatial neighborhood of the pixel being averaged and the average intensity in a spatial neighborhood of the pixel at the x and y;
  - the sum, taken over a two-dimensional neighborhood of x and y, of the absolute value of the difference between the intensity of a pixel displaced from x and y and the intensity of a pixel identically displaced from the pixel being averaged;
- determining a weighted average using the weights and the pixel intensities; and
- identifying the weighted average as the filtered output at pixel location x, y, and t.

16. The machine readable medium of claim 15, wherein a group of weights is determined by applying a functional relationship defined for each weight to the metric to which it applies.

17. The method of claim 15, wherein the neighborhood has a dimension of 3 frames by 5 lines by 15 pixels per line.

18. A video filtering processor for reducing picture noise in a plurality of video frames configured to:
- select a first pixel from one of the video frames, the first pixel having location coordinates at a horizontal position x, a vertical position y, and a time t;
- determine weights for a set of pixel intensities in the video frames, wherein each weight is based on at least one pixel in a neighborhood of the first pixel and at least one pixel in a neighborhood of the pixel to be weighted, the weight applied to a pixel is determined by a functional relationship to at least one of the following metrics:
  - the spatial distance between the location coordinates x, y, and the location coordinates of the pixel being averaged;
  - the difference between the time t and a value of time associated with the pixel being averaged;
  - the spatial distance between the location coordinates x, y and the motion compensated values of the spatial location coordinates of the pixel being averaged;
  - the absolute value of the average difference between the intensity of the pixel at x, y, t and the intensity of the pixel being averaged;
  - the difference between the average intensity in a two-dimensional spatial neighborhood of the pixel being averaged and the average intensity in a spatial neighborhood of the pixel at the x and y;
  - the sum of the absolute values of the difference between the intensity in a two-dimensional neighborhood of x and y and a point identically displaced from the pixel being averaged; and
- determine a weighted average using the weights and the pixel intensities; and identify the weighted average as the filtered output at pixel location x, y, and t.

19. The video filtering processor of claim 18, wherein a group of weights is determined by applying a functional relationship defined for each weight to the metric to which it applies.

20. The video filtering processor of claim 18, wherein the neighborhood has a dimension of 3 frames by 5 lines by 15 pixels per line.

* * * * *